United States Patent Office 2,759,904
Patented Aug. 21, 1956

2,759,904

ORGANOSILICON ELASTOMERS CONTAINING AN IRON SALT OF A CARBOXYLIC ACID AS A HEAT STABILIZER

Thomas D. Talcott, Midland, Mich., assignor to Dow Corning Corporation, Midland, Mich., a corporation of Michigan No Drawing. Application February 25, 1955, Serial No. 490,680

10 Claims. (Cl. 260—37)

This invention relates to novel silicone elastomers which are both heat stable and translucent.

Organosiloxane elastomers, popularly known as silicone rubbers, are well known and firmly established in the commercial world. Silicone rubber has developed a well deserved reputation for excellent heat stability and is often employed primarily because of its retention of desired physical properties at high temperature.

However, it has been found difficult to obtain a translucent silicone rubber which retains all of the heat stability characteristics now expected of silicone rubber. The translucent silicone rubber heretofore available has been inferior in heat stability to the earlier known opaque silicone rubber.

It is an object of this invention to prepare novel translucent silicone rubber heretofore unknown having heat stability equal to that obtained with any other silicone rubber. Further objects and advantages accruing through this invention are detailed in or will be apparent from the following specification and the appended claims.

This invention relates to a heat curable composition consisting essentially of (a) an organosilicon composition of the average general formula

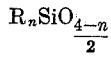

wherein R represents an organic radical selected from the group consisting of monovalent hydrocarbon radicals and halogenated monovalent hydrocarbon radicals and $n$ has a value of 1.9 to 2.1, (b) a silica filler, (c) .001 to .400 part by weight based on 100 parts of (a) of iron added as an iron salt of a carboxylic acid and (d) an organoperoxide vulcanizing agent.

The organosilicon compositions, designated as $a$ above, are well known materials having the general formula

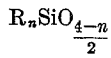

R can be any monovalent hydrocarbon radical or any halogenated monovalent hydrocarbon radical. Examples of the organic radicals represented by R include alkyl radicals such as methyl, ethyl and octadecyl; aryl radicals such as phenyl and anthracyl; alkaryl radicals such as tolyl, xylyl, and methyl naphthyl; aralkyl radicals such as benzyl and phenylethyl; cycloaliphatic radicals such as cyclohexyl and cyclopentyl; alkenyl radicals such as vinyl and allyl; and halogenated monovalent hydrocarbon radicals such as chloromethyl, difluorophenyl, bromophenylethyl, trifluorovinyl and $\alpha,\alpha,\alpha$-trifluoromethylphenyl.

The organosilicon compositions $a$ of this invention have been commercially available for many years. Many methods of preparation of such materials are known and are adequately documented in the literature of the art. These siloxanes can be either homopolymeric or copolymeric materials containing 2 or more different types of siloxane units and organic radicals attached to any one silicon atom can be the same or the radicals attached to any one silicon atom can be different.

The silica filler $b$ employed herein can be any fume silica, silica aerogel, diatomaceous earth or other silica employed as filling agents for silicone rubber. These materials are well known, commercially available products produced by known methods. In general, the so-called reinforcing silica fillers as disclosed in U. S. Patent 2,541,137, issued February 13, 1951, are preferred but any silica filler is operative in this invention.

The improved heat stability of the organosiloxane elastomers of this invention would seem to be due to the presence of iron as an iron salt of a carboxylic acid. The iron salts of any carboxylic acid are operative in this invention. Illustrative of such salts are ferric acetate, ferrous butyrate, ferric octoate, ferric laurate, ferric naphthenates, ferric benzoate, ferric maleate, ferric citrate, and ferrous stearate.

The iron salt of carboxylic acid is added in amounts determined by the iron content of the salt. The amount of iron added as a salt should be in the range of .001 to .400 part by weight of iron per 100 parts of the organosilicon composition $a$. It is not the amount of salt added but the amount of iron added as the salt which is critical. When the iron is present to an extent less than .001 part of iron by weight per 100 parts of the organosilicon compound $a$, the heat stability is not appreciably improved. The presence of more than .4 part of iron by weight per 100 parts of the organosilicon compound $a$ results in a plastic product after curing rather than a rubbery product. Further, the presence of excessive amounts of iron results in coloring and loss of the translucent quality available in certain organosiloxane rubbers.

It is desirable that the iron salt be soluble in the organopolysiloxane. However, if the iron salt can be evenly dispersed throughout the organosiloxane, it is not necessary that it be soluble. The important factor is that the iron salt be dispersed evenly throughout the ultimate mixture and a soluble salt will obviously be easier to so disperse.

The organosiloxane rubber stocks of this invention are vulcanized by incorporating any of the organic peroxides such as benzoyl peroxide, t-butylperbenzoate, and halobenzoyl peroxide into the said stocks and thereafter heating the mixture.

The elastomers of this invention can be compounded by any desired means. For example, the iron salt $c$ can be dispersed throughout the organosilicon compound $a$ on a roll mill and thereafter the silica filler $b$ can be admixed therewith. This can be followed by admixing into the mixture of $a$, $b$, and $c$ the vulcanizing agent $d$ and thereafter curing and vulcanizing the mixture to produce the desired elastomeric organosiloxane. Alternative procedures are obvious and are included within the scope of this invention.

The organopolysiloxane elastomers of this invention are useful for any of the heretofore known applications for heat vulcanized silicone rubbers. Thus, the uses for the materials of this invention range from electrical insulation to baby bottle nipples.

The examples which follow are intended to aid those skilled in the art to better understand this invention, and are not to be construed as limiting the invention, the scope of which is properly delineated in the claims. All parts and percentages in the examples are based on weight unless otherwise specified.

EXAMPLE 1

An organopolysiloxane rubber stock was compounded on a two-roll mill. 100 parts of a dimethylsiloxane polymer having a viscosity exceeding 1,000,000 cs. at 25° C., and 0.12 part of iron as ferric octoate were milled together. 35 parts of a fume silica filler were added and milled in followed by 1.5 parts benzoyl peroxide. The entire mixture was thoroughly milled and a sheet of the resulting organosiloxane rubber stock was cured for 5 minutes at 125°–130° C. A similar stock, except for the ferric octoate which was omitted, was compounded and cured using the same techniques and conditions. To test the heat stability of the cured rubber, samples were heated at 300° C. for 16 hours. The rubber sample which did not contain iron was found to be brittle and virtually useless after this period of heating whereas the sample containing ferric octoate retained its elastic properties even after this extreme heating test. The inclusion of iron in the elastomer resulted in an excellent, heat stable, translucent silicone rubber product.

EXAMPLE 2

Employing the method of Example 1, silicone rubber stocks were made with the siloxane polymer, silica filler and vulcanizing agent of Example 1 with .024 part of iron as ferric acetate and .06 part iron as a ferric acetate paste. The resulting stocks were molded and tested by heating at 250° C. for 24 hours and at 300° C. for 16 hours. In each case the stocks containing ferric acetate retained elasticity and rubberyness whereas the control stock, which did not contain the iron salt, showed excessive loss of the desired physical properties after such extended heating.

EXAMPLE 3

Equivalent results are obtained when a copolymeric organosiloxane comprising 85 mol per cent dimethylsiloxane, 10 mol per cent phenylmethylsiloxane, 4.8 mol per cent α,α,α-trifluorotolylmethylsiloxane, and 0.2 mol per cent methylvinylsiloxane was substituted for the dimethylsiloxane of Example 1.

That which is claimed is:

1. A heat curable organopolysiloxane rubber stock consisting essentially of (a) an organosilicon compound of the average general formula $$R_nSiO_{\frac{4-n}{2}}$$

wherein R represents an organic radical selected from the group consisting of monovalent hydrocarbon radicals and halogenated monovalent hydrocarbon radicals and $n$ has a value of 1.9 to 2.1, (b) a silica filler and (c) .001 to .400 part by weight per 100 parts of $a$ of iron added as an iron salt of a carboxylic acid, (d) an organoperoxide vulcanizing agent.

2. The organopolysiloxane rubber stock of claim 1 in which the silica filler is a fume silica.

3. A heat curable organopolysiloxane rubber stock consisting essentially of (a) a dimethylpolysiloxane, (b) a fume silica filler, (c) .001 to .4 part by weight based on 100 parts of $a$ of an iron salt of a carboxylic acid and (d) an organoperoxide vulcanizing agent.

4. An organosiloxane elastomer consisting essentially of (a) an organosilicon compound of the average general formula $$R_nSiO_{\frac{4-n}{2}}$$

wherein R represents an organic radical selected from the group consisting of monovalent hydrocarbon radicals and halogenated monovalent hydrocarbon radicals and $n$ has a value of 1.9 to 2.1, (b) a silica filler and (c) .001 to .400 part by weight per 100 parts of $a$ of iron added as an iron salt of a carboxylic acid.

5. The organosiloxane elastomer of claim 4 in which the silica filler is a fume silica.

6. An organosiloxane elastomer consisting essentially of (a) a dimethylsiloxane, (b) a fume silica filler, (c) .001 to .400 part by weight based on 100 parts of $a$ of an iron salt of a carboxylic acid.

7. A heat curable organopolysiloxane rubber stock consisting essentially of (a) a dimethylpolysiloxane, (b) a fume silica filler, (c) .001 to .4 part by weight based on 100 parts of $a$ of ferric octoate, (d) an organo peroxide vulcanizing agent.

8. A heat curable organopolysiloxane rubber stock consisting essentially of (a) a dimethylpolysiloxane, (b) a fume silica filler, (c) .001 to .4 part by weight based on 100 parts of $a$ of ferric acetate, (d) an organo peroxide vulcanizing agent.

9. An organosiloxane elastomer consisting essentially of $a$) dimethylsiloxane, (b) a fume silica filler, (c) .001 to .400 part by weight based on 100 parts of $a$ of ferric acetate.

10. An organosiloxane elastomer consisting essentially of (a) a dimethylsiloxane, (b) a fume silica filler, (c) .001 to .400 part by weight based on 100 parts of $a$ of ferric octoate.

References Cited in the file of this patent
UNITED STATES PATENTS
2,449,572    Welsh _____ Sept. 21, 1948